June 12, 1973   F. OSBORNE ET AL   3,738,820
METHOD OF AND APPARATUS FOR THE PROCESSING OF MOLTEN SLAG
Filed June 1, 1970   2 Sheets-Sheet 1

INVENTORS.
FRED OSBORNE,
SELWYNE P. KINNEY.
BY
Parmelee, Utzler & Welsh
their ATTORNEYS.

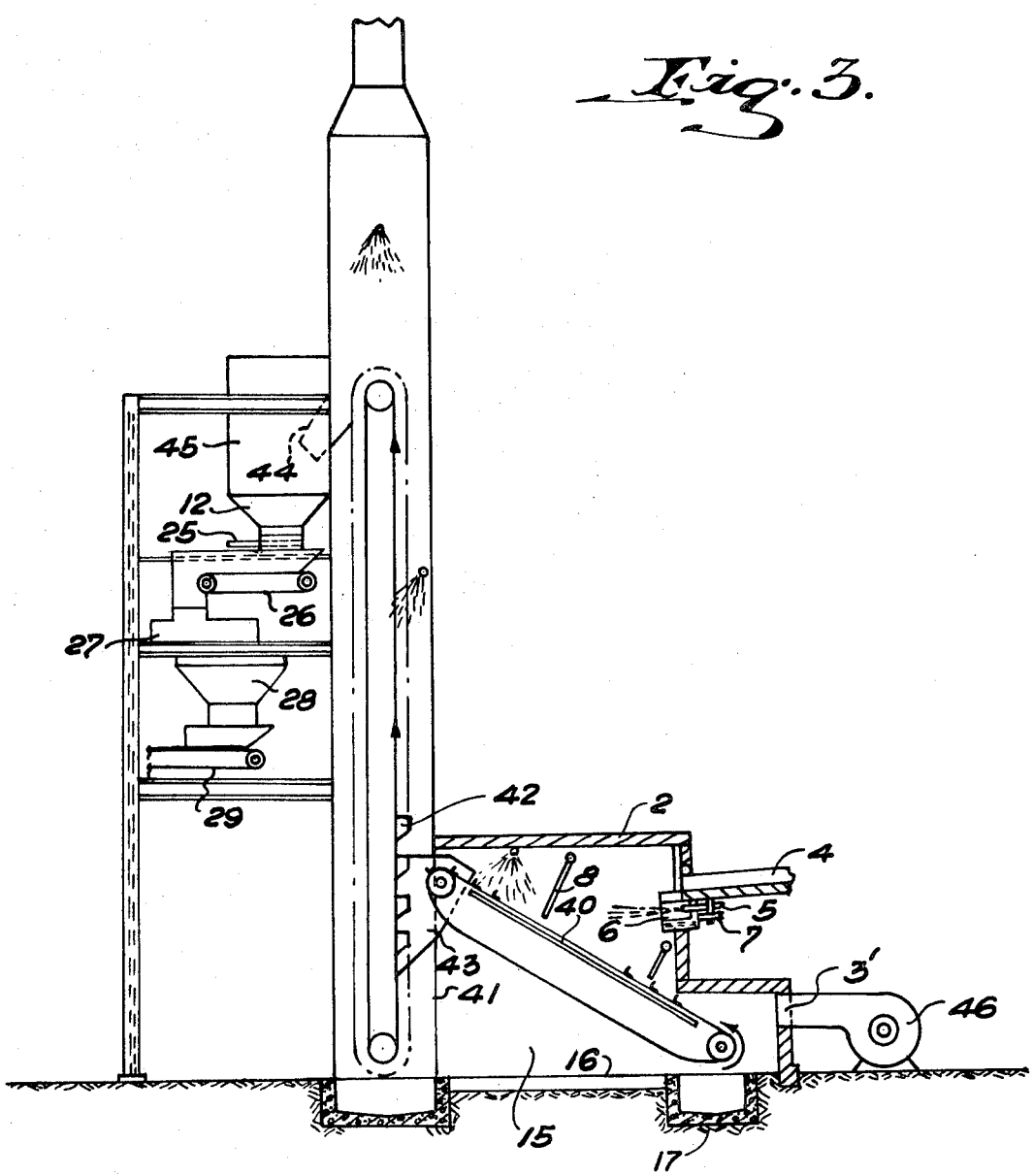

United States Patent Office 3,738,820
Patented June 12, 1973

3,738,820
METHOD OF AND APPARATUS FOR THE PROCESSING OF MOLTEN SLAG
Fred Osborne, Birmingham, Ala., and Selwyne P. Kinney, Carnegie, Pa., assignors to S. P. Kinney Engineers, Inc., Carnegie, Pa.
Filed June 1, 1970, Ser. No. 42,434
Int. Cl. C03b *19/08*
U.S. Cl. 65—19                                       9 Claims

ABSTRACT OF THE DISCLOSURE

This application discloses an improvement in an apparatus for and method of expanding molten slag such as blast furnace slag by contacting it with water, as shown for example in Pat. No. 2,702,407, granted Feb. 22, 1955. According to this invention, the apparatus for contacting the slag with water and the conveyor for the expanded slag is enclosed. The vapors and gases resulting from this operation are conducted from the enclosure into an outlet duct system comprising a stack. Air flow is induced through the enclosure, and in the environment within the enclosure $H_2S$ is converted into $SO_2$ and $H_2O$, and elemental sulphur will also result from the reactions which take place in this enclosure. Most of the solids entrained in the gases settle out of the gases inside the enclosure and are carried out on the conveyor.

The effluent gases from the enclosure are contacted in the outlet duct system with water in the form of a spray, this taking place either in the stack or in a gas washer into which the stack gases flow from the stack. The spray of water dissolves $SO_2$ and removes entrained solids.

---

This invention relates to the treating of molten slag, as for example, blast furnace slag, and is for a method of and apparatus for the reduction of air pollution incident to processes where molten slag is contacted with water to produce granulated or expanded light-weight slag aggregate.

Although not limited to an apparatus and method as disclosed in Pat. No. 2,702,407, granted Feb. 22, 1955 to Fred Osborne, one of the present applicants, for a Method of and Apparatus for the Production of Light Weight Slag, the invention is particularly useful in conjunction with such apparatus, and will be hereinafter described in combination with such a method and apparatus.

In the processing of molten slag contacting it with water to granulate or expand it, large quantities of steam are evolved, and since most slags, particularly blast furnace slag, contain some combined sulphur, particularly calcium sulfide (CaS) and sodium sulfide ($Na_2S$), hydrogen sulfide ($H_2S$) is evolved according to the reactions:

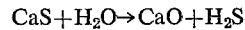
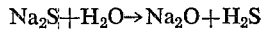

$$CaS + H_2O \rightarrow CaO + H_2S$$
$$Na_2S + H_2O \rightarrow Na_2O + H_2S$$

Observable amounts of elemental sulphur, as well as $SO_2$ gas are produced from the $H_2S$ by oxidation after the $H_2S$ has been formed with the following reactions:

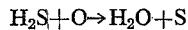
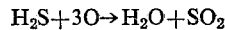

$$H_2S + O \rightarrow H_2O + S$$
$$H_2S + 3O \rightarrow H_2O + SO_2$$

In addition with $H_2S$ and $SO_2$ both present, there is a further reaction between these two compounds that forms additional elemental sulphur and water according to the reaction:

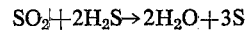

$$SO_2 + 2H_2S \rightarrow 2H_2O + 3S$$

The $H_2S$ and $SO_2$ not reacting together pass out with the steam and these compounds are both obnoxious and destructive. Consequently steel plants, particularly in urban areas, are embarassed by air pollution restrictions and pressures to eliminate the air pollution. Pollution is aggravated also by fine dust that is generated by the more or less explosives conditions that effect granulation or expansion and the elemental sulphur, some of which may be so fine as to be readily air-borne although it tends to settle for the most part around the apparatus in which it is generated. The evolution of gases from the slag may continue in the process of the Osborne patent above identified as the slag cools for a period of time while it is conveyed away from the processing equipment, since the slag which is disrupted in a molten condition into pellets is initially contacted with a fine mist of water that is insufficient to fully quench the slag and leaves the interior of the pellets incandescent.

The present invention is for a method and apparatus wherein the granulation of expanding equipment is enclosed, and the product is retained in an enclosure until practically all evolution of gases has stopped. A current of atmospheric air is induced through the enclosure. Much of the dust and fine solids will settle within the enclosure, settling mainly on the slag being moved through the enclosure while the air with entrained gases and remaining dust is passed through a washer that removes suspended solids and dissolves the $SO_2$, this being more soluble than the $H_2S$. By insuring an adequate supply of air to the enclosure, there will be little $H_2S$ in the effluent gases and the concentration of $SO_2$ in the water from the washer will be so low as to have no damaging effect to streams, rivers, or lakes into which it may eventually be discharged, or it may be chemically neutralized at low cost. Moreover the environment wherein $SO_2$ and $H_2S$ are confined is favorable to the production of elemental sulphur according to the reaction above described because the closed environment forces the gases to commingle and react, something which does not result where the equipment is in the open atmosphere. In addition, since a large part of elemental sulphur will settle with other dust, or be removed in the washer, such conversion of the sulphur to elemental form further reduces the volume of sulphurous gases to be dissolved in the wash water.

In the drawings:

FIG. 3 is a view similar to FIG. 1 showing a somewhat modified arrangement.

Figure 2:
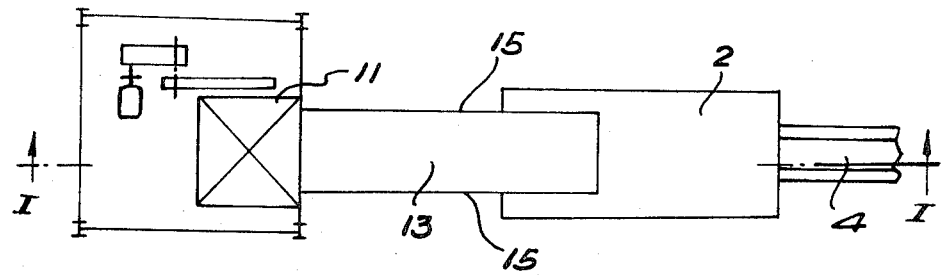
FIG. 2 is a schematic top plan view of the apparatus shown in FIG. 1.
Figure 1:
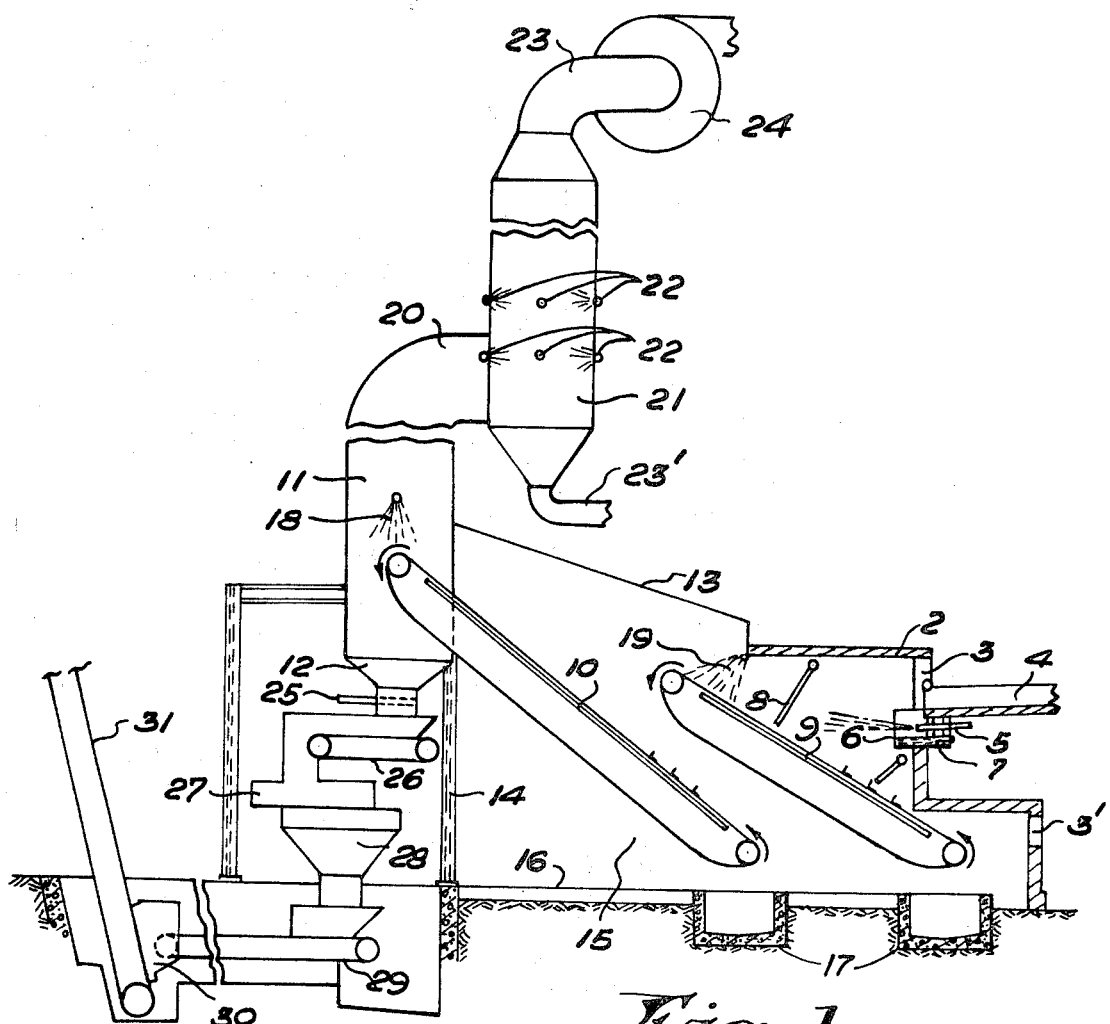
FIG. 1 is a schematic general assembly view representing a longitudinal vertical section through a typical installation, the section being generally in the plane of line I—I of FIG. 2.

Referring first to FIG. 1, it shows schematically an enclosure 2 which is here shown as being refractory lined but such lining is optional and is not required. It has openings 3 and 3' in one end wall thereof which wall has a stepped construction as shown in FIG. 1. A runner 4 from which slag flows from a blast furnace terminates at opening 3. The slag cascading from the lip of this runner passes in front of a central nozzle 5 supported by enclosure 2 at a position just below opening 3. A jet of high velocity steam from the nozzle breaks the falling stream into small molten masses or pellets which are projected outwardly through a mist developed by water sprays located around the interior of a U-shaped trough 6 and located about the central nozzle 5, also rearwardly of the falling stream. These atomizing nozzles are indicated at 7, the arrangement being described in detail in said Osborne Pat. No. 2,702,407. The small bodies of slag travel toward a deflector plate 8 through the fine mist of water and fall onto a flight or drag conveyor 9. The water applied in limited amounts expands the slag, which is carried upward by the conveyor and discharged onto a second flight or drag conveyor 10. Much of the slag received on the conveyor will be sufficiently hot to agglomerate into clinker-like bodies, and the emission of gases and vapors therefrom may continue for some distance. Openings 3 and 3' serve as air inlet ports and are both disposed upstream of the spray of water coming from nozzles 5 and 7. The significance of this relationship of the air inlet ports to the spray nozzle, as well as to the remainder of this apparatus will be elaborated upon hereinafter.

The upper end of the conveyor 10 terminates in the lower end of an outlet duct preferably in the form of a vertical stack 11. There is a receiving hopper 12 at the bottom of this stack. According to this invention, there is an addition to the enclosure extending the partial enclosure 2 to completely enclose the expanding apparatus and conveyors. This enclosure includes a roof 13, a back wall 14, and side walls 15 of suitable materials impervious to attack such as sheet metal or asbestos, with the bottom being closed by the foundation 16. The width from one side wall to the other need be little greater than the width of the conveyor. Drainage sumps 17 are located in the bottom or floor 16.

If desired, there may be one or more water sprays in the stack above the discharge end of the conveyor, as indicated at 18, and there may be sprays over the conveyors inside the enclosure as indicated at 19 for washing down dust in the atmosphere and for accelerating the cooling of the slag. The stack 11 discharges into a duct 20 that opens into a gas washer 21. Gas washers are well known in the industry in a variety of forms, and usually comprise an enclosure where the gas travels through or countercurrently to sprays or films of water. The washer 21 is here shown as having a plurality of spray nozzles 22 around the interior with an outlet 23 at the top and a drain pipe 23' at the bottom. The washed gas outlet 23 leads to a suction fan 24.

The hopper 12 has a gate 25 at the bottom which may be normally closed, particularly when there is not enough accumulated slag in the hopper to substantially exclude the free ingress of air, and it may then be opened to discharge expanded slag masses onto an enclosed horizontal conveyor 26 that in turn discharges into an enclosed crusher 27. This breaks the agglomerated expanded slag masses which have now been cooled into usable aggregate that is discharged into a hopper 28. From the hopper 28 the finished material is discharged onto a second horizontal belt conveyor 29 into a pit 30, from whence it may be removed in any suitable manner, a bucket elevator 31 being here shown for this purpose.

When the suction fan 24 is operating, atmospheric air enters the slag treating enclosure through opening 3 and port 3'. Compared to the size of the openings 3 and 3' the cross-sectional area of the enclosure is sufficiently larger than the air inlet passages 3 and 3' to form an expansion chamber within which the slag-expanding unit and conveyors are located, so that air moves at slow velocity through the enclosure to allow suspended solids to settle inside the enclosure before the gases pass into the stack 11. This expansion chamber and the fact that inlet ports 3 and 3' are upstream of nozzles 5 and 7 assures that adequate air will be continuously supplied to the area in front of the nozzles so that most of the $H_2S$ will be converted either to $SO_2$ or elemental sulphur. Without this current of air, the steam that is produced is laden with $H_2S$. The low velocity flow of air toward the stack allows a considerable portion of entrained dust and small solid particles to settle, most of it settling onto the bed of slag on the conveyor and will be carried thereby out of the expansion area. As long as the volume of air is sufficient to keep gases from accumulating in the enclosure and effect circulation through the washer, the volume is not critical and will vary in different plants and with different sulphur content in the slag.

In the stack the air moves at higher velocity, carrying away gases from the cooling slag, while the gate of valve 25 normally excludes much influx of air through the hopper 12. In the gas washer most of any entrained solids in the air which do not settle out in the enclosure and steam from the enclosure is removed by the water spray, steam is condensed and most of the $SO_2$ will be dissolved in the water, so that there is little objectionable odor or dust discharged from the fan 24 into the atmosphere.

It has heretofore been proposed to enclose the slag granulating apparatus, but this has been found more objectionable than open air processing, because it merely aggravated the air pollution, but with the enclosure with forced circulation of air and the wet cleaning of the air, gases and vapors prior to their discharge into the atmosphere, air pollution in the surrounding community is reduced to a negligible level.

In FIG. 3 the forward partial enclosure and slag-expanding arrangement is the same as in FIG. 1, and corresponding reference numerals indicate corresponding parts. In this arrangement, a single long flight or drag conveyor 40 replaces the two conveyors 9 and 10 of FIG. 1 and the partial refractory-lined enclosure extends rearwardly to the stack 41. There are of course side walls to the enclosure, a bottom, and the stack forms a back wall.

There is a vertical bucket conveyor 42 in the stack, and the conveyor 40 discharges into a transfer hopper 43 by which the slag is transferred from the drag conveyor to the bucket conveyor. The slag cools on the conveyor 40 and bucket conveyor 42, so that its gases come off within the overall enclosure. The bucket elevator or conveyor 42 discharges into a chute 44 at the top of the elevator and the treated slag travels into the receiving hopper 45 which is enclosed. The receiving hopper discharges through gate 25 as in FIG. 1 to a horizontal conveyor 26, the same as in FIG. 1, being carried to a crusher 27, this part of the apparatus being similar to FIG. 1, and corresponding reference numerals designate similar parts.

In this arrangement a wet gas washer may be provided as in FIG. 1, but it has been omitted from the drawing in FIG. 3. In this arrangement a blower has been shown at 46 for forcing air through port 3', replacing the suction fan 24 of FIG. 1. Either type of air-circulating means, a blower or a fan, may be used in either arrangement. Moreover, the apparatus may be constructed with a stack designed to produce a draft induced air flow, with or without the provision of fans or other means to supplement the draft. Here, as in FIG. 1, the dimensions of the enclosure are such that the air velocity through the enclosure to the stack is reduced. The port 3 is preferably closed except for the runner, to exclude substantial blowing out of gases, and if desired, some or all of the air may be blown in at this location instead of through port 3'.

The invention provides an enclosure both around the expansion area and around the conveyors so that not only the vapors or gases which may still be given off while the slag is being carried away after it has been expanded, but the heat is conserved to more effectively effect the reactions hereinbefore described while adequate air flow is provided, but the velocity over the conveyors is low, conducive to the settling of solids and without too extensive reduction or dilution of the gases. In addition, since the environment is closed, the $SO_2$ formed and the $H_2S$ remaining after the initial oxidation thereof are forced to commingle and contact each other to react and produce water and additional elemental sulphur. Any $SO_2$ remaining will go through the stack to be washed and dissolved. Thus, the enclosure should be sized so that adequate volume is provided for the commingling of the gases while at the same time allowing the gases to circulate through the enclosure to the stack. In other words, the enclosure must not be so large as to preclude proper commingling and circulation, nor so small as to prevent proper circulation and inadequate oxygen supply for the chemical reactions.

It is apparent that while the conveyor discharge terminal is positioned in the stack, the stack could be otherwise located above the conveyor. The effluent gases are carried through the stack or the combined stack and washer, as the case may be, each providing a duct system in which the gases are contacted with water spray to dissolve $SO_2$ gas and remove fine dust still entrained in the gases.

While we have shown and described specific preferred embodiments of our invention, this is by way of illustration, and the invention is applicable to other slag granulating or expanding apparatus and conveyor systems than that here shown.

We claim:

1. In an apparatus for processing molten slag wherein flowing molten slag is disrupted into discontinuous fragments which are then contacted by sprays of water to condition the slag but insufficient to cool all of the slag below the temperature where some of the fragments will fuse together and in which water vapor and also $H_2S$ and $SO_2$ gases are generated by reaction of the water with sulphur-bearing material in the slag and wherein the still heated slag after being contacted with the water is removed by a conveyor means while it cools with the further liberation of sulphurous gases, the invention comprising:
   (a) an enclosure substantially enclosing the entire apparatus including the entire conveyor means, said enclosure having an air inlet port at one end thereof with said end being so arranged that the inlet port is upstream of the sprays of water;
   (b) an outlet system at the end of the enclosure opposite the inlet port in which said conveyor means terminates and discharges the treated slag and where the air, water vapor and gases, including reaction products of the liberated gas, air and water vapor traveling concurrently with the slag which is cooling on the conveyor is removed and which system subsequently discharges into the atmosphere;
   (c) enclosed means communicating with the duct system for receiving the treated slag from the conveyor;
   (d) means for inducing a forced circulation of air entering the inlet port into the enclosure and out the duct system whereby said sulphurous gases and water vapor and air are intimately mixed as they travel with the hot slag toward and into the duct system; and
   (e) means in the duct system for contacting the gases with a water spray through which the gases moving in the duct must pass.

2. The invention as defined in claim 1 in which the interior of the enclosure constitutes an expansion chamber for reducing the velocity of air flow after it enters through the port and before it passes into the outlet duct.

3. The invention defined in claim 1 wherein the outlet duct system comprises a vertical stack.

4. The invention defined in claim 1 wherein the outlet duct system comprises a vertical stack and a wet gas washer at the top of the stack into which the stack discharges and which in turn discharges washed gases to the atmosphere.

5. The invention defined in claim 3 in which the discharge end of the conveyor terminates at the stack and there is a hopper closed to outside air but in communication with the stack arranged to receive processed slag from the conveyor and wherein there is a gate at the bottom of the hopper through which processed slag may be discharged and wherein the gate may be closed to prevent the free influx of air except when slag is being discharged.

6. The invention defined in claim 5 in which the hopper is at the bottom of the stack and below the discharge end of the conveyor.

7. The invention defined in claim 5 in which the hopper is located above the bottom of the stack and an elevating conveyor within the stack is operatively interposed between the discharge terminal of the first conveyor and the hopper.

8. The invention defined in claim 1 wherein the outlet duct system comprises a vertical stack, and wherein the enclosure has spray nozzles therein arranged to direct sprays of water into the enclosure, the enclosure having drains at the bottom for removal of spray water along with dust and dissolved gases.

9. In the method of processing molten slag wherein a flowing stream of molten slag is disrupted into discontinuous fragments, contacted with water in an amount insufficient to prevent all of the fragments from agglomerating into fused clinker-like bodies with the interiors still glowing with heat, and with the generation of gases and vapors, and the slag is subsequently removed from the environment where such contact is effected, the steps of:
   (a) effecting the contact of the slag and water in a closed environment with an air inlet disposed upstream of the source of water;
   (b) transporting the still heated slag after it has been initially contacted with water while it cools through the closed environment;
   (c) effecting a forced circulation of air along with evolved water vapor and sulphurous gases through the environment concurrently with and in contact with the still heated slag to react the water vapor, air and gases in said environment while simultaneously cooling the slag;
   (d) passing the resulting gaseous products and vapors from said closed environment through a water spray and removing therefrom entrained solids and water soluble gases and condensing water vapor; and
   (e) discharging the washed air to the atmosphere.

References Cited

UNITED STATES PATENTS

| | | | |
|---|---|---|---|
| 2,014,044 | 9/1935 | Haswell | 55—85 |
| 2,702,407 | 2/1955 | Osborne | 65—20 |
| 3,063,686 | 11/1962 | Irvin | 261—118 X |
| 3,523,015 | 8/1970 | Grady | 65—20 X |

ROBERT L. LINDSAY, JR., Primary Examiner

U.S. Cl. X.R.

55—73; 65—19, 141; 261—117, DIG. 9